United States Patent
Vayrynen (10) Patent No.: US 6,256,304 B1
(45) Date of Patent: Jul. 3, 2001

(54) MOBILE STATION USING SYNCHRONIZATION WORD ORDER INFORMATION FOR IMPROVED CHANNEL ACQUISITION

(75) Inventor: Mika Vayrynen, Oulu (FI)

(73) Assignee: Nokia Mobile Phones, Limited, Espoo (FI)

( * ) Notice: Subject to any disclaimer, the term of this patent is extended or adjusted under 35 U.S.C. 154(b) by 0 days.

(21) Appl. No.: 09/052,658

(22) Filed: Mar. 31, 1998

(51) Int. Cl.⁷ .................................................. H04J 3/06
(52) U.S. Cl. ...................... 370/350; 375/354; 375/365; 375/367
(58) Field of Search .................... 370/350, 277, 370/347, 514, 345, 336, 330; 375/365, 367, 354, 368; 455/434, 343, 455, 525, 502; 714/704, 774

(56) References Cited

U.S. PATENT DOCUMENTS

| | | | |
|---|---|---|---|
| 3,971,888 | * 7/1976 | Ching et al. | 178/69.5 |
| 4,301,534 | * 11/1981 | Genter | 370/105 |
| 4,553,251 | * 11/1985 | Hartmann | 375/114 |
| 4,649,543 | * 3/1987 | Levine | 371/41 |
| 4,847,869 | * 7/1989 | Labedz et al. | 375/85 |
| 4,905,234 | * 2/1990 | Childress et al. | 370/94.1 |
| 5,008,953 | * 4/1991 | Dahlin et al. | 455/33 |
| 5,214,687 | 5/1993 | Kansakoski et al. | 379/60 |
| 5,241,545 | 8/1993 | Kazecki et al. | 370/106 |
| 5,263,026 | 11/1993 | Parr et al. | 370/95.1 |
| 5,276,691 | 1/1994 | Kivari | 371/47.1 |
| 5,299,235 | * 3/1994 | Larsson et al. | 375/365 |
| 5,345,448 | 9/1994 | Keskitalo | 370/95.3 |
| 5,408,504 | * 4/1995 | Ostman | 375/354 |
| 5,410,733 | 4/1995 | Niva et al. | 455/33.2 |
| 5,483,668 | 1/1996 | Malkamaki et al. | 455/33.2 |
| 5,521,926 | * 5/1996 | Ayerst et al. | 370/953 |
| 5,524,009 | 6/1996 | Tuutijarvi et al. | 370/95.3 |
| 5,590,160 | * 12/1996 | Ostman | 375/367 |
| 5,768,268 | * 6/1998 | Kline et al. | 370/330 |
| 5,838,745 | * 11/1998 | Wang et al. | 375/364 |

* cited by examiner

Primary Examiner—Dang Ton
Assistant Examiner—Anthony Ton
(74) Attorney, Agent, or Firm—Ohlandt, Greeley, Ruggiero & Perle, LLP (57) ABSTRACT

A method is disclosed for operating a mobile station (10). The method includes a first step of receiving a message from a base station (30), the message being descriptive of an assigned forward digital channel and including an information element that specifies an order of occurrence of time slot synchronizing word sequences within a frame. A next step receives a forward channel from the base station, the forward channel being transmitted to contain repeating frames each having N time slots, individual ones of the time slots including a synchronization word. A further step correlates the received forward channel in accordance with the received information element so as to obtain a plurality of frame synchronization indications within one frame, thereby decreasing the frame synchronization time.

15 Claims, 7 Drawing Sheets

SYNCHRONIZATION SEQUENCES

THE SYNC WORDS ARE SPECIFIED BY THE FOLLOWING PHASE CHANGES IN RADIANS:

| | | | | | | | | | | | | | | |
|---|---|---|---|---|---|---|---|---|---|---|---|---|---|---|
| SYNC 1 | $-\frac{\pi}{4}$ | $-\frac{\pi}{4}$ | $-\frac{\pi}{4}$ | $\frac{3\pi}{4}$ | $\frac{\pi}{4}$ | $\frac{3\pi}{4}$ | $\frac{3\pi}{4}$ | $-\frac{\pi}{4}$ | $\frac{\pi}{4}$ | $\frac{\pi}{4}$ | $\frac{\pi}{4}$ | $\frac{\pi}{4}$ | $-\frac{\pi}{4}$ | $-\frac{\pi}{4}$ |
| SYNC 2 | $-\frac{\pi}{4}$ | $-\frac{\pi}{4}$ | $-\frac{\pi}{4}$ | $\frac{3\pi}{4}$ | $\frac{3\pi}{4}$ | $\frac{3\pi}{4}$ | $\frac{\pi}{4}$ | $-\frac{\pi}{4}$ | $\frac{\pi}{4}$ | $\frac{\pi}{4}$ | $-\frac{3\pi}{4}$ | $\frac{\pi}{4}$ | $-\frac{\pi}{4}$ | $-\frac{\pi}{4}$ |
| SYNC 3 | $-\frac{3\pi}{4}$ | $\frac{\pi}{4}$ | $\frac{3\pi}{4}$ | $-\frac{3\pi}{4}$ | $-\frac{3\pi}{4}$ | $-\frac{3\pi}{4}$ | $\frac{\pi}{4}$ | $\frac{\pi}{4}$ | $\frac{\pi}{4}$ | $-\frac{3\pi}{4}$ | $\frac{\pi}{4}$ | $-\frac{3\pi}{4}$ | $\frac{\pi}{4}$ | $\frac{\pi}{4}$ |
| SYNC 4 | $\frac{\pi}{4}$ | $-\frac{3\pi}{4}$ | $\frac{3\pi}{4}$ | $\frac{3\pi}{4}$ | $\frac{\pi}{4}$ | $\frac{\pi}{4}$ | $-\frac{3\pi}{4}$ | $-\frac{3\pi}{4}$ | $-\frac{3\pi}{4}$ | $\frac{\pi}{4}$ | $\frac{\pi}{4}$ | $\frac{\pi}{4}$ | $-\frac{3\pi}{4}$ | $-\frac{3\pi}{4}$ |
| SYNC 5 | $\frac{\pi}{4}$ | $\frac{3\pi}{4}$ | $-\frac{3\pi}{4}$ | $-\frac{3\pi}{4}$ | $-\frac{\pi}{4}$ | $-\frac{\pi}{4}$ | $-\frac{\pi}{4}$ | $\frac{\pi}{4}$ | $-\frac{3\pi}{4}$ | $-\frac{3\pi}{4}$ | $\frac{3\pi}{4}$ | $\frac{3\pi}{4}$ | $\frac{\pi}{4}$ | $\frac{3\pi}{4}$ |
| SYNC 6 | $-\frac{3\pi}{4}$ | $\frac{3\pi}{4}$ | $\frac{3\pi}{4}$ | $-\frac{3\pi}{4}$ | $\frac{\pi}{4}$ | $-\frac{\pi}{4}$ | $-\frac{\pi}{4}$ | $-\frac{\pi}{4}$ | $\frac{\pi}{4}$ | $\frac{\pi}{4}$ | $\frac{\pi}{4}$ | $-\frac{3\pi}{4}$ | $-\frac{3\pi}{4}$ | $\frac{3\pi}{4}$ |

SYNC WORD USAGE

| TIME SLOT / LINE | 1 | 2 | 3 | 4 | 5 | 6 |
|---|---|---|---|---|---|---|
| 1 | 1 | 2 | 3 | 4 | 5 | 6 |
| 2 | 1 | 2 | 3 | 1 | 5 | 6 |
| 3 | 1 | 2 | 3 | 4 | 5 | 6 |
| 4 | 1 | 2 | 3 | 4 | 2 | 6 |
| 5 | 1 | 2 | 3 | 1 | 5 | 3 |
| 6 | 1 | 2 | 3 | 4 | 2 | 6 |
| 7 | 1 | 2 | 3 | 1 | 5 | 3 |
| 8 | 1 | 2 | 3 | 1 | 2 | 3 |

MOBILE STATION USING SYNCHRONIZATION WORD ORDER INFORMATION FOR IMPROVED CHANNEL ACQUISITION

CROSS-REFERENCE TO A RELATED PATENT APPLICATION

This patent application is related to commonly assigned U.S. patent application Ser. No. 08/870,808, filed Jun. 6, 1997, now U.S. Pat. No. 6,154,457 entitled "Mobile Station Having Improved DCCH Synchronization", by Mika V äyrynen.

FIELD OF THE INVENTION

This invention relates generally to radiotelephones and, in particular, to radiotelephones or mobile stations such as those capable of operation with a cellular network.

BACKGROUND OF THE INVENTION

Frame synchronization, i.e., the search for an assigned time slot, is the first task that a mobile station performs when it is attempting to synchronize to a given digital channel, either a traffic or a control channel.

FIGS. 1A–1D depict the frame, slot, and slot synchronization (SYNC) word sequences and SYNC word usages, respectively, for an exemplary prior art digital Time Division Multiple Access (TDMA) cellular air interface known in the art as IS-136 (see, for example, IS-136.1, Rev. A, Mar. 21, 1996 and IS-136.2, Rev. A, Feb. 12, 1996).

Figure 1:
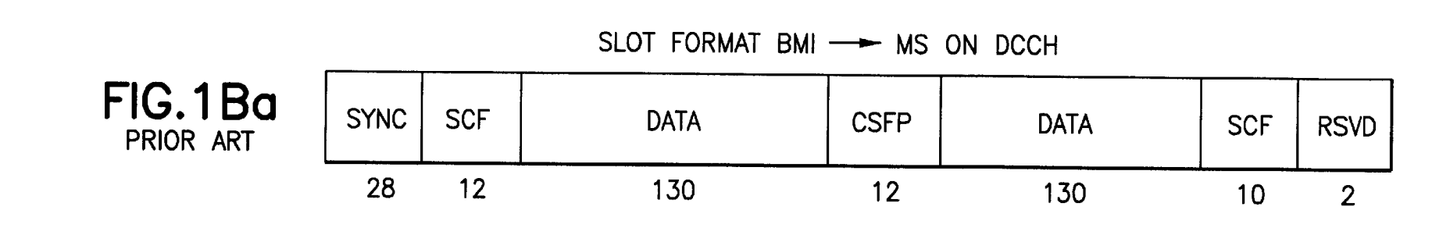
FIGS. 1A–1D depict a frame, slot, slot synchronization (SYNC) word sequences and SYNC word usages, respectively, for an exemplary prior art digital Time Division Multiple Access (TDMA) cellular air interface that is suitable for practicing this invention.
Figure 1A:
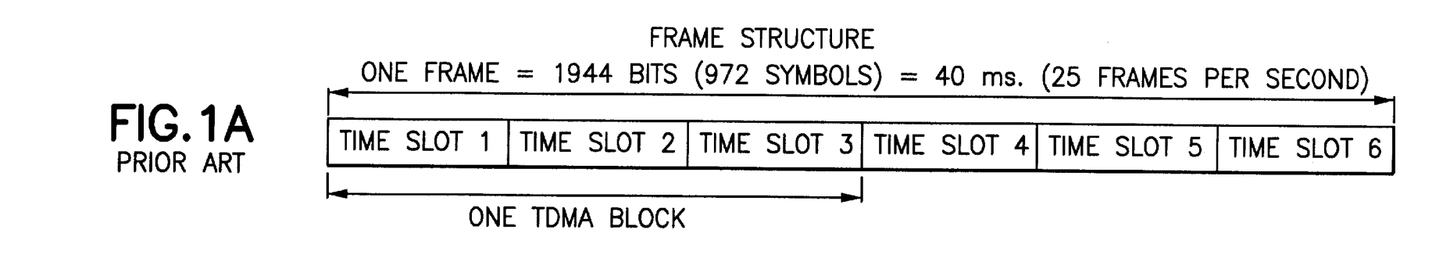

FIG. 1A shows that a 40 millisecond frame consists of six time slots (other TDMA systems may use more or less than six slots per frame). Slots 1–3 and 4–6 each comprise one TDMA Block. In the forward direction from a base station to a mobile station, which is a case of most interest to this invention, the frames are continuously transmitted. A given mobile station is assigned to receive in one slot per frame for a half data rate case, and is assigned to receive in two time slots for a full data rate case. FIGS. 1Ba and 1Bb illustrate the format of one slot in the direction from the base station to the mobile station (i.e., the forward direction). The base station forms a part of a Base Station/Mobile Switching Center/Interworking function (BMI).

In particular, FIG. 1Ba illustrates one time slot of a Digital Control Channel (DCCH) that is transmitted by the BMI on a forward channel. The 28 bit (14 symbol) SYNC word/time slot identifier field occupies the first 28 bits of the frame, and is followed by various other fields, including a first Shared Channel Feedback (SCF) field, a first part of a DATA field, a Coded Superframe Phase (CSFP) field, a second part of the DATA field, a second SCF field, and a Reserved (RSVD) field of two bits.

FIG. 1Bb illustrates one time slot of a Digital Traffic Channel (DTC) that is transmitted by the BMI on a forward channel. As in the DCCH, the 28 bit (14 symbol) SYNC word/time slot identifier field occupies the first 28 bits of the frame, and is followed by various other fields, including a Slow Associated Control Channel (SACCH) field, a first part of a DATA field, a Coded Digital Verification Color Code (CDVCC) field, a second part of the DATA field, a one bit Reserved (RSVD) field, and a Coded Digital Control Channel Locator (CDL) field.

Of most interest to this invention is the SYNC word field that is sent at the beginning of each of the DCCH and DTC slots.

Figure 1C:
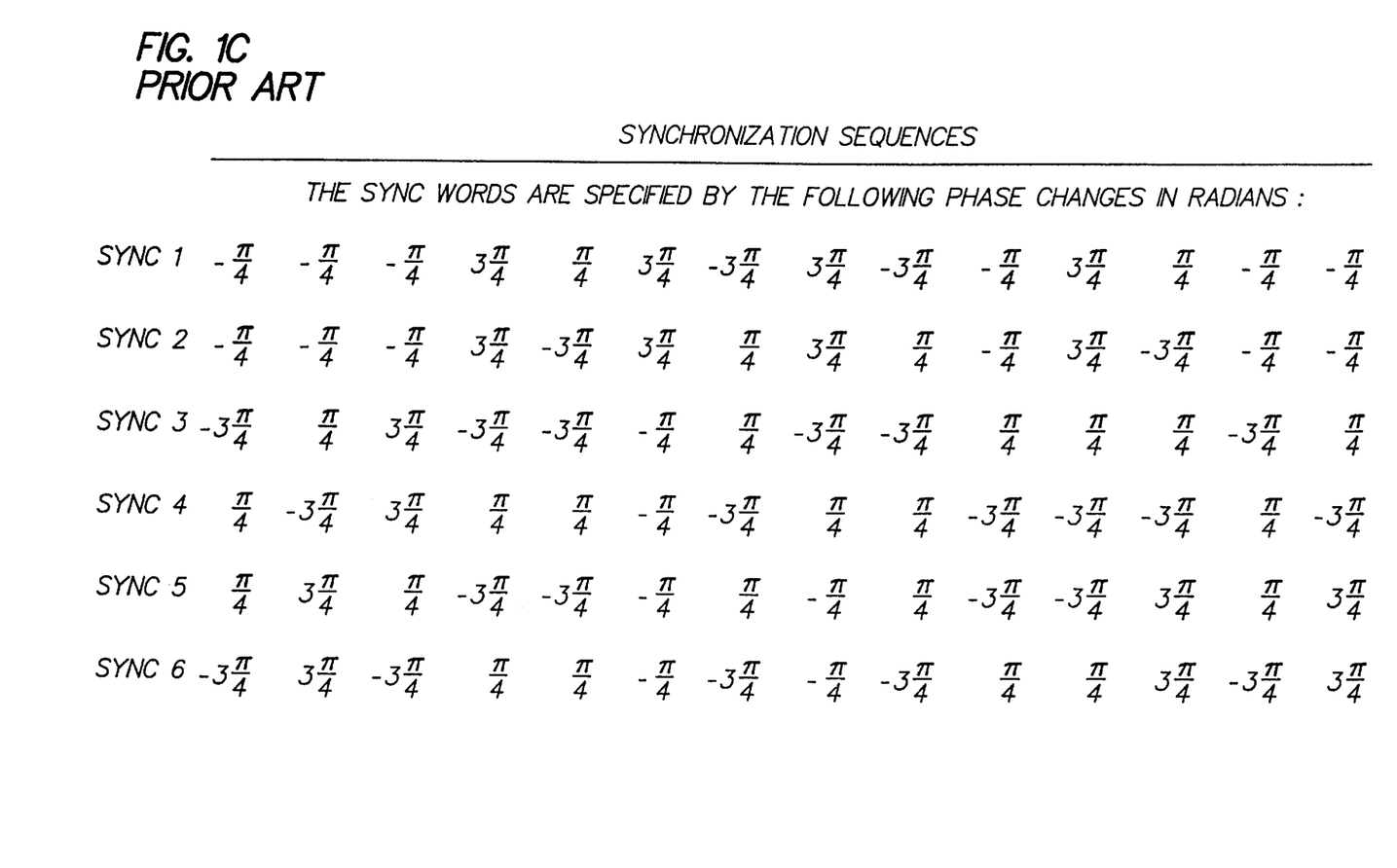
Figure 1D:
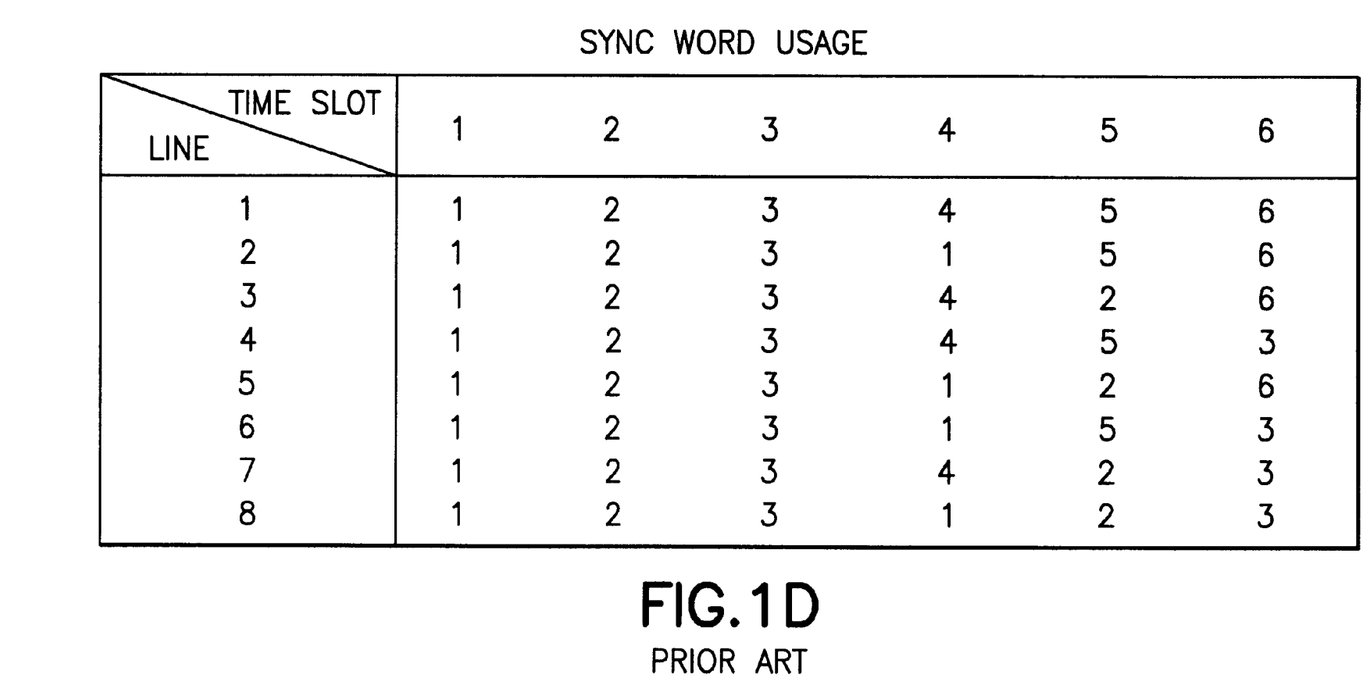

The SYNC word/time slot identifier field is used for slot synchronization, equalizer training, and time slot identification. The six unique synchronization sequences shown in FIG. 1C are defined so as to have good autocorrelation properties to facilitate synchronization and training. Six time slot identifiers are defined, which have good cross correlation properties. Line 8 of FIG. 1D identifies the SYNC words for a channel fully assigned to full-rate users (i.e., three full-rate users per frame). Line 1 of FIG. 1D identifies the SYNC words for a channel fully assigned to half-rate users (i.e., six half-rate users per frame). Lines 2 through 7 identify the SYNC word order for a mixture of full-rate and half-rate users, such that only one SYNC word is assigned per user. Unassigned slots are indicated by the base station as half-rate user slots in the time slot identifier field. The mobile station uses its assigned SYNC word when transmitting on a Reverse Digital Traffic Channel (RDTC).

Figure 5:
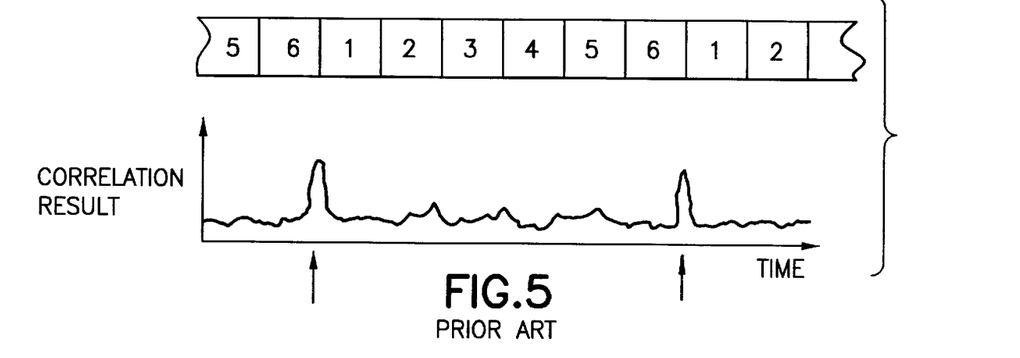
FIG. 5 depicts a conventional mobile station SYNC word correlation result.

When a mobile station first comes to a digital channel it locates and then synchronizes to a DCCH. From the DCCH the mobile station is able to determine various access and other network parameters, and from which the mobile station is eventually handed off to a Digital Traffic Channel (DTC). When switching to a DTC, either in response to an initial DTC assignment or in response to a handover command from one DTC to another DTC, the mobile station must be able to quickly and accurately locate its assigned downlink slot or slots by correlating received SYNC fields with one of the SYNC word sequences (see FIG. 1C) that are stored in the mobile station. Referring also to FIG. 5, and assuming that the mobile station is assigned to slot 1, correlations using the SYNC word sequence assigned to slot 1 that are performed over received slots will produce a correlation peak for received symbols that match the corresponding slot 1 SYNC word sequence. The locations of the correlation peaks is thus an indication of the location of the mobile station's assigned slot 1 within the continuously transmitted forward DTC.

It can be appreciated that a number of frames may be required to be received before a high enough confidence level is obtained as to the location of the mobile station's assigned slot(s), especially when receiving a noisy or fading signal. As such, a considerable delay may be incurred when first acquiring the DTC and/or the possibility exists that a call may be dropped during a handover from a first DTC to a second DTC.

It should be remembered that under conventional practice the mobile station does not know how the received DTC frame is being allocated to other mobile stations. For example, the SYNC word usage for a given frame may be any one of the eight cases shown in FIG. 1D. As such, the mobile station is not enabled to predict which SYNC word sequences will appear in slots four through six, and cannot thus utilize any a priori knowledge of other SYNC sequences in these slots in an attempt to synchronize to its assigned slot or slots.

OBJECTS AND ADVANTAGES OF THE INVENTION

It is thus a first object and advantage of this invention to provide an improved method for synchronizing a mobile station to a forward channel of a digital communications system.

It is a further object and advantage of this invention to provide a method of operating a mobile station so as to improve the acquisition of digital traffic channels, and handoff between digital traffic channels.

It is another object and advantage of this invention to provide an improved signalling protocol for informing a mobile station of an order of appearance of synchronization words in slots of a digital traffic or control channel, thereby enabling the mobile station to perform multiple correlations on received slots so as to more quickly synchronize to a desired slot.

SUMMARY OF THE INVENTION

The foregoing and other problems are overcome and the objects and advantages are realized by methods and apparatus in accordance with embodiments of this invention.

A method is disclosed for operating a mobile station, as is a mobile station that operates in accordance with the method. The method includes a first step of receiving a message from a base station, the message being descriptive of an assigned forward digital channel and including an information element that specifies an order of occurrence of time slot synchronization word sequences within a frame. A next step receives a forward channel from the base station, the forward channel being transmitted to contain repeating frames each having N time slots, individual ones of the time slots including a synchronization word. A further step correlates the received forward channel in accordance with the received information element so as to obtain a plurality of frame synchronization indications within one frame, thereby decreasing the frame synchronization time.

In the preferred embodiment the first N/2 of the time slots are transmitted to have a same sequence of N/2 synchronization words, whether the channel is a half-rate channel or a full-rate channel, and the second N/2 of the time slots are transmitted to have a variable sequence of synchronization words depending on whether half data rate or full data rate mobile stations are assigned to the frame.

The received message may be, for example, one of a Digital Traffic Channel Designation message for assigning the mobile station to a digital traffic channel, or a Digital Traffic Channel Handoff message for handing off the mobile station from a current digital traffic channel to a different digital traffic channel.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 2:
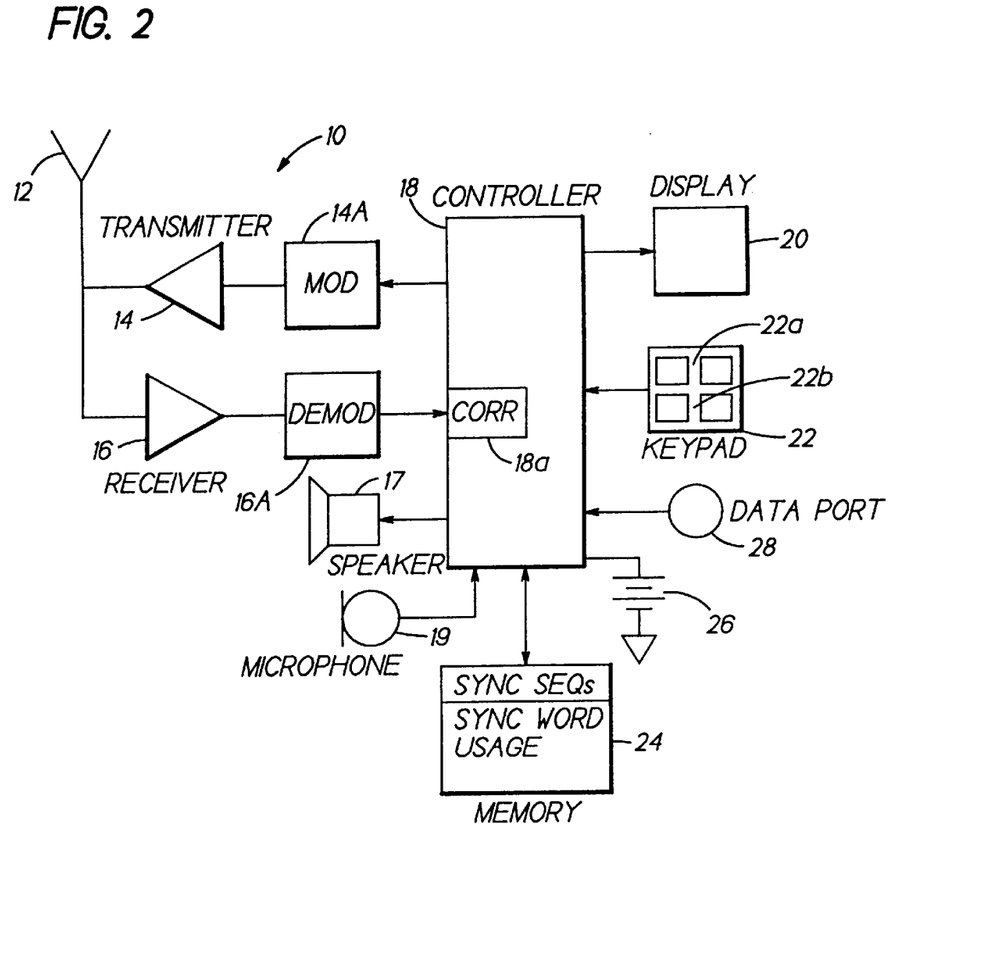
FIG. 2 is a block diagram of a mobile station that is constructed and operated in accordance with this invention.
Figure 3:
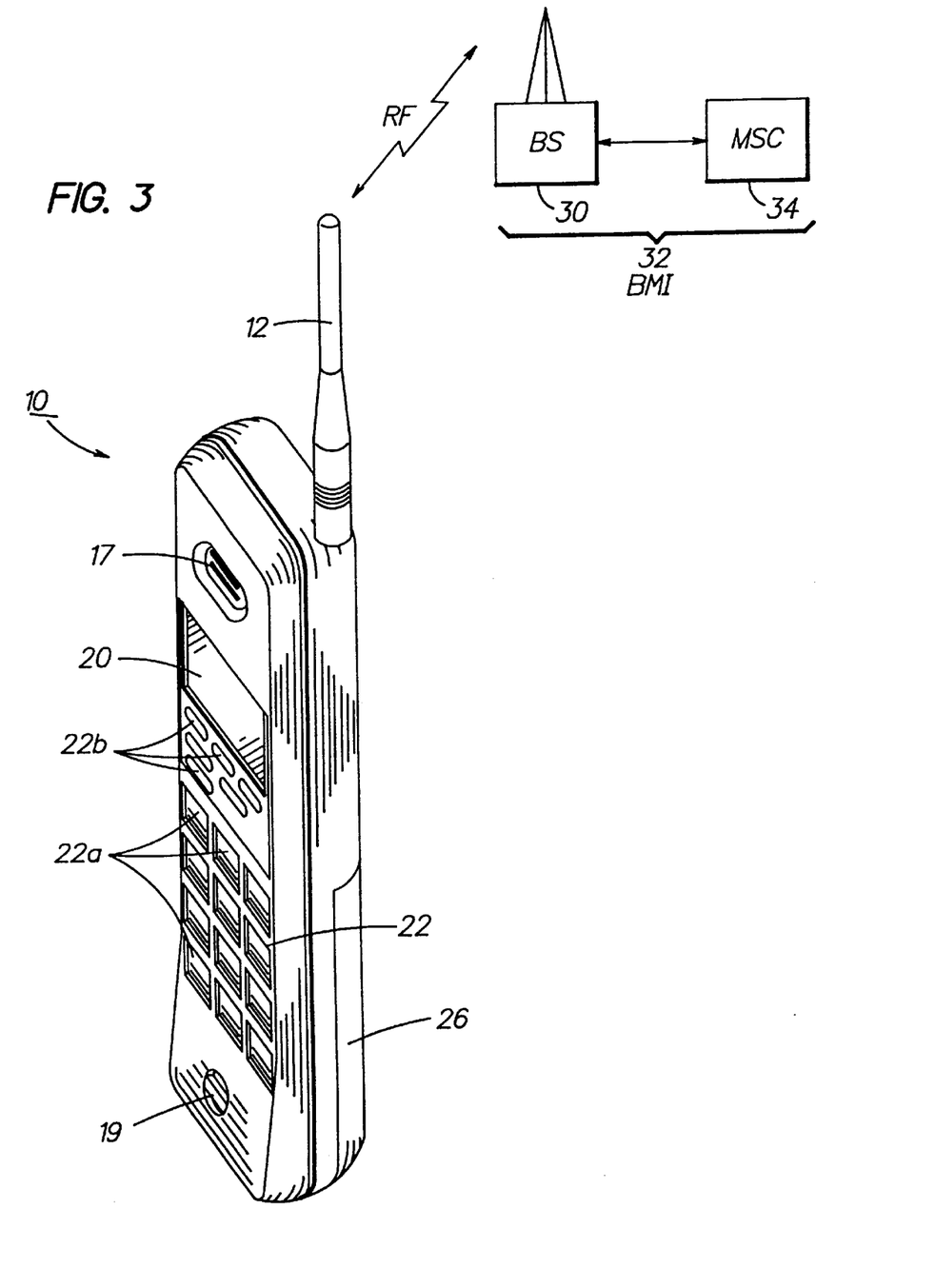
FIG. 3 is an elevational view of the mobile station shown in FIG. 2, and which further illustrates a cellular communication system to which the mobile station is bidirectionally coupled through wireless RF links.

Reference is made to FIGS. 2 and 3 for illustrating a wireless user terminal or mobile station 10, such as but not limited to a cellular radiotelephone or a personal communicator, that is suitable for practicing this invention. The mobile station 10 includes an antenna 12 for transmitting signals to and for receiving signals from a base site or base station 30. The base station 30 is a part of a cellular network comprising the Base Station/Mobile Switching Center/Interworking function (BMI) 32, which further includes a mobile switching center (MSC) 34. The MSC 34 provides a connection to landline trunks when the mobile station 10 is involved in a call.

The mobile station includes a modulator (MOD) 14A, a transmitter 14, a receiver 16, a demodulator (DEMOD) 16A, and a controller 18 that provides signals to and receives signals from the transmitter 14 and receiver 16, respectively. These signals include signalling information in accordance with the air interface standard of the applicable cellular system, and also user speech and/or user generated data. The air interface standard is assumed for this invention to include a physical and logical frame and slot structure and SYNC word sequences of a type that was described above, although the teaching of this invention is not intended to be limited only to this specific structure, or for use only with an IS-136 compatible mobile station, or for use only in TDMA type systems.

It is understood that the controller 18 also includes the circuitry required for implementing the audio and logic functions of the mobile station. By example, the controller 18 may be comprised of a digital signal processor device, a microprocessor device, and various analog to digital converters, digital to analog converters, and other support circuits. The control and signal processing functions of the mobile station are allocated between these devices according to their respective capabilities.

A user interface includes a conventional earphone or speaker 17, a conventional microphone 19, a display 20, and a user input device, typically a keypad 22, all of which are coupled to the controller 18. The keypad 22 includes the conventional numeric (0–9) and related keys (#,*) 22a, and other keys 22b used for operating the mobile station 10. These other keys 22b may include, by example, a SEND key, various menu scrolling and soft keys, and a PWR key. The mobile station 10 also includes a battery 26 for powering the various circuits that are required to operate the mobile station.

The mobile station 10 also includes various memories, shown collectively as the memory 24, wherein are stored a plurality of constants and variables that are used by the controller 18 during the operation of the mobile station. For example, the memory 24 stores the values of various cellular system parameters and the number assignment module (NAM). An operating program for controlling the operation of controller 18 is also stored in the memory 24 (typically in a ROM device). The memory 24 may also store data, including user messages, that is received from the BMI 32 prior to the display of the messages to the user. The operating program in the memory 24 includes routines to present messages and message-related functions to the user on the display 20, typically as various menu items. The memory 24 also includes routines for implementing the method described below in relation to FIG. 4.

It should be understood that the mobile station 10 can be a vehicle mounted or a handheld device. It should further be appreciated that the mobile station 10 can be capable of operating with one or more air interface standards, modulation types, and access types. By example, the mobile station may be capable of operating with other standards besides IS-136 that use a similar slot identification technique. Dual or higher mode phones (e.g., TDMA/analog or TDMA/CDMA/analog) can also benefit from the teaching of this invention. It should thus be clear that the teaching of this invention is not to be construed to be limited to any one particular type of mobile station or air interface standard.

The memory 24 also stores a representation of the synchronizing sequences (SYNC SEQs) 1–6, as shown in FIG. 1C, which are used by a correlator (CORR) 18a for correlating with received SYNCH sequences. Suitable, but not limiting, embodiments of the correlator 18a are described in commonly assigned U.S. Pat. No. 5,408,504, "Symbol and Frame Synchronization in a TDMA System", to Kjell Ostman, and in commonly assigned U.S. Pat. No. 5,590,160, "Symbol and Frame Synchronization in both a TDMA System and a CDMA System", also to Kjell Ostman. The disclosures of these two commonly assigned U.S. Patents are incorporated by reference herein in their entireties for teaching suitable, but not limiting, embodiments of the correlator 18a.

In accordance with an aspect of this invention, the memory 24 also stores a SYNC Word Usage data element which is received from the base station 30, and which is employed by the method described below. The stored SYNC Word Usage information identifies one of the lines of the SYNC Word Usage table shown in FIG. 1D, and thus gives an order of occurrence of the SYNC Sequences 1–6 in a frame of a forward channel to which the mobile station 10 is to be assigned by the base station 30.

As was discussed earlier, in digital channels mobile station 10 has no information of which synchronization words are used in other than its own time slot(s). In accordance with this invention, by adding information about the usage of the eight possible synchronization word sequences to the control channel data, the mobile station 10 is enabled to use several slots in the synchronization process, without making selections between correlation results calculated over different synchronization words per one slot. This SYNC word usage information that describes valid synchronization words in the received data stream decreases the possibility of the mobile station 10 making a wrong decision due to radio channel disturbances.

The method reduces frame synchronization time (handoff time) to a DTC since the mobile station 10 is enabled to use more synchronization words when calculating correlation results.

Figure 6:
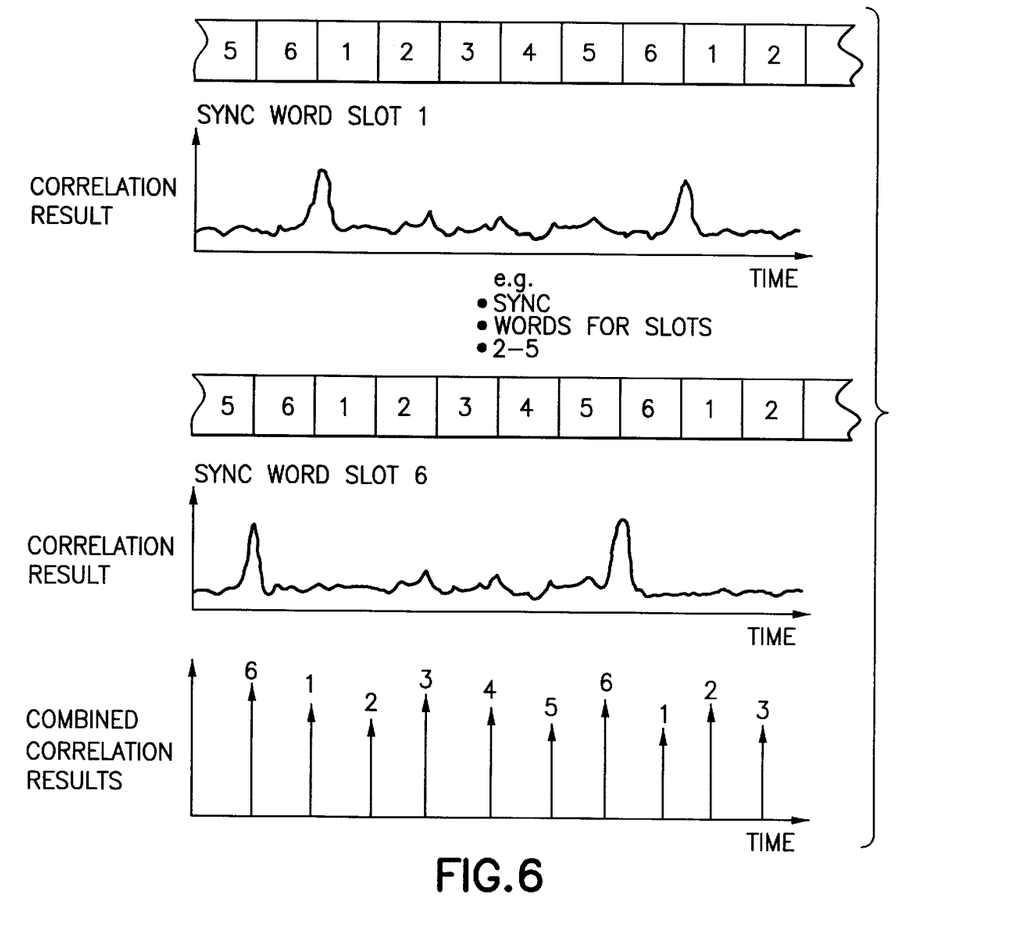
FIG. 6 depicts a mobile station SYNC word correlation result in accordance with an aspect of this invention.

For example, and referring to FIG. 6, the mobile station 10 is enabled to correlate a plurality of received slots using the stored SYNC Sequences in the memory 24 since the mobile station is provided with a priori knowledge of which ones of the SYNC words, and the order of appearance of the SYNC words, in each of slots 1–6. Contrasting FIG. 5 to FIG. 6, it can be seen that the resulting combined correlation results provides the mobile station 10 with considerably more information upon which to base its decision about the location of its assigned time slot(s).

In the digital control channel the mobile station 10 can use other algorithms based on a known synchronization word structure in a TDMA block when controlling synchronization while operating in the reduced power sleep mode. After entering a digital control channel the mobile station 10 can remain in the sleep mode between page messages. Normally this requires a fast synchronization process to adjust the mobile station's timing after each sleep period. In order to minimize power consumption, the use of a mobile station-known synchronization word structure is clearly a benefit. Of course, to be of maximum benefit this method requires that the order of the training or synchronization sequences remain unchanged between pages. The training sequence order information can be received with each page message.

Assume a case wherein a half rate mobile station 10 must receive its own time slot synchronization word four times, because of radio channel disturbances, before it can make a firm decision when determining the starting point of its assigned time slot. Since the half rate option is used this requires at least 4*40 ms=160 ms, and gives in one frame only one autocorrelation decision point, i.e., the point in time when the correlation result achieved its maximum value.

However, in accordance with the teaching of this invention, in the same frame period the mobile station 10 is enabled to obtain up to six autocorrelation decision points (see FIG. 6), since the mobile station 10 knows the identities of the synchronization words in the other, non-assigned time slots. For the full rate case the mobile station 10 is enabled to obtain three autocorrelation decision points per frame. This approach can thus be used to reduce the time required for the frame synchronization process. For the half rate case, and to obtain four autocorrelation decision points, the mobile station 10 need only receive four consecutive time slots ((40 ms/6)*4=26.7 ms.) It can thus be shown that the method in accordance with the teaching of this invention is up to six times faster/more efficient (for the IS-136, six time slot case) when the half rate option is used, or up to three times faster/more efficient when the full rate option is used, as compared to the conventional approach shown in FIG. 5 that uses only the one (assigned) synchronization word.

The method in accordance with this invention thus reduces the frame synchronization time (handoff time) to a DTC because it is possible to use several synchronization words per TDMA frame when calculating correlation results.

Figure 4:
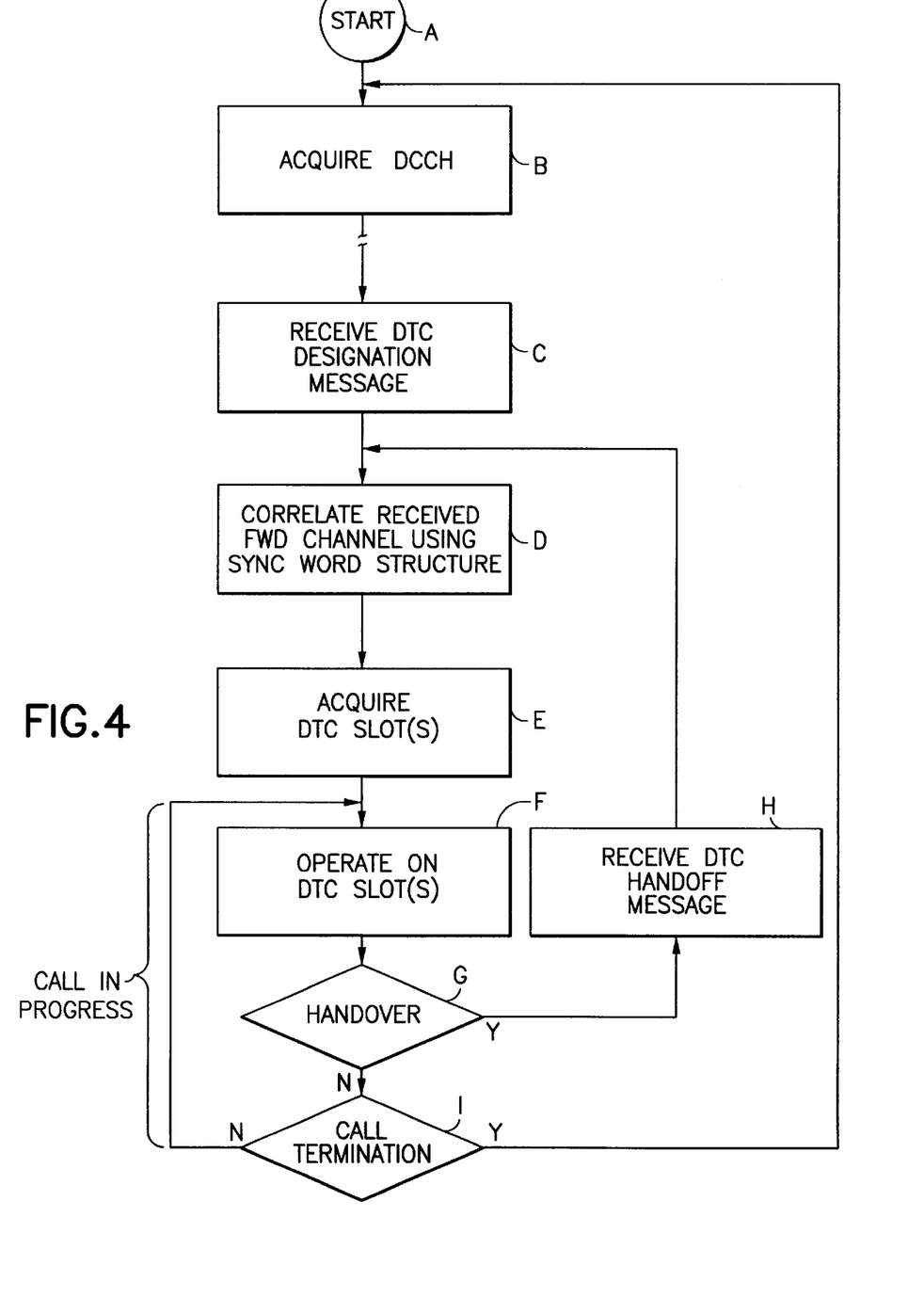
FIG. 4 is a logic flow diagram that illustrates a method in accordance with this invention.

Reference is now made to FIG. 4 for showing a synchronization method in accordance with this invention. A Block A the method starts, such as when the mobile station 10 is first switched on. At Block B the mobile station acquires a DCCH and, if not immediately originating a call, camps on the acquired DCCH. At some subsequent time the mobile station 10 receives a DTC Designation message from the base station 30 (see IS-136.1, Section 6.4.3.6). In addition to conveying information regarding the DVCC, DMAC, time alignment, etc., of the assigned DTC, the DTC Designation message in accordance with this invention includes a Synchronizing Word Structure information element that specifies to the mobile station 10 one of the eight SYNC Word Usages shown in FIG. 1D for the DTC frame to which the mobile station 10 is being assigned. In response to receiving this information element the mobile station 10 stores the received SYNC Word Usage information element in the memory 24 in the SYNC Word Usage location. At Block D the mobile station 10 tunes its receiver to the assigned DTC frequency and operates the correlator 18a to perform multiple correlations of the received data stream using stored SYNC word sequences in the order identified by the stored SYNC Word Usage information. At Block E the mobile station 10 becomes synchronized to the forward DTC and acquires its assigned slot or slots. The acquisition of the slot or slots is facilitated by using the combined SYNC word correlation results as indicated in FIG. 6.

At Block F the mobile station 10 operates on the DTC using its assigned slot or slots. Such operation may entail receiving at least one handover or handoff command from the serving base station 30 (Block G). If a handoff is required control passes to Block H where the mobile station 10 receives a Dedicated Digital Traffic Channel Handoff message from the serving base station. As with the DTC Designation message, in addition to conveying information regarding the DVCC, DMAC, time alignment, etc., the Dedicated DTC Handoff message in accordance with this invention includes the Synchronizing Word Structure information element that specifies to the mobile station 10 one of the eight SYNC Word Usages shown in FIG. 1D. In response to receiving this information element the mobile station 10 stores the received SYNC Word Usage information element in the memory 24 in the SYNC Word Usage location. Control then passes to Block D where the new DTC is acquired using the last stored SYNC Word Usage information element from the received Dedicated DTC Handoff message of Block H.

Returning to Block G, if a handoff is not required a determination is made if the call is terminated. If not, operation returns to Block F, otherwise the DTC is released and control passes back to Block B to reacquire the same DCCH or to acquire a new DCCH.

Using this method the mobile station 10 is able to quickly and reliably select the correct SYNC word sequences for the correlation calculations, and can thus more quickly synchronize to the forward channel, which is the desired result.

In a preferred embodiment of the invention, after sending the DTC Designation message the base station 30 is constrained for some period of time (e.g., 500 ms) from changing the synchronization word structure, i.e., the order of appearance of the six synchronization words in the DTC frame.

Also in a preferred embodiment of the invention, if the Dedicated DTC Handoff message does not contain the Synchronization Word Structure information element, then the mobile station 10 assumes that the new DTC has the same synchronization sequence structure as the current DTC.

Although described in the context of preferred embodiments, it should be realized that a number of modifications to these teachings may occur to one skilled in the art. By example, the method of FIG. 4 is not limited to receiving only the specified messages from the base station 30, as other message types may be received when operating with other TDMA systems. Also, the invention has been described in the context of receiving the SYNC Word Usage information from the DCCH. However, in other embodiments of this invention an Analog Control Channel (ACCH) signalling may be modified so as to provide this information, enabling the mobile station 10 to more quickly synchronize to a digital channel when transitioning from the analog channel.

Thus, while the invention has been particularly shown and described with respect to preferred embodiments thereof, it will be understood by those skilled in the art that changes in form and details may be made therein without departing from the scope and spirit of the invention.

What is claimed is:

1. A method for operating a wireless terminal, comprising the steps of:
   receiving a message from a base station, the message being descriptive of an assigned forward digital channel and including an information element that specifies an order of occurrence of time slot synchronization words within a frame;
   receiving a forward digital channel signal from the base station, the forward digital channel signal being transmitted to contain repeating frames each comprising N time slots, individual ones of the time slots including a synchronization word such that there are N synchronizing words within a frame; and
   correlating the received forward digital channel signal in accordance with the received information element so as to obtain a plurality of frame synchronization indications within one frame.

2. A method as in claim 1, wherein there are M possible different sequences of the synchronizing words, and where M>N.

3. A method as in claim 2, wherein M=8 and N=6.

4. A method as in claim 1, wherein the first N/2 of the time slots are transmitted to have a same sequence of N/2 synchronization words whether the channel is a half-rate channel or a full-rate channel, and wherein the second N/2 of the time slots are transmitted to have a variable sequence of synchronization words depending on whether half data rate or full data rate wireless terminals are assigned to the frame.

5. A method as in claim 1, wherein the message is a Digital Traffic Channel Designation message for assigning the wireless terminal to a digital traffic channel.

6. A method as in claim 1, wherein the message is a Digital Traffic Channel Handoff message for handing off the wireless terminal from a current digital traffic channel to a different digital traffic channel.

7. A mobile station, comprising:
   a receiver and demodulator for receiving and demodulating a forward digital channel signal from a base station, the forward digital channel signal being transmitted to contain repeating frames each comprising N time slots, individual ones of the time slots including a synchronization word such that there are N synchronizing words within a frame, said receiver and demodulator further receiving and demodulating a message from the base station, the message being descriptive of an assigned forward digital channel and including an information element that specifies an order of occurrence of time slot synchronization words within a frame;
   a memory storing a plurality of predetermined synchronization word sequences and said received information element;
   a correlator for correlating the received forward digital channel signal in accordance with the stored received information element and at least some of the plurality of predetermined synchronization word sequences so as to obtain a plurality of frame synchronization indications within one frame; and
   a controller for synchronizing to a desired time slot of the forward digital channel using the plurality of frame synchronization indications.

8. A mobile station as in claim 7, wherein there are M possible different sequences of the synchronizing words, and where M>N.

9. A mobile station as in claim 8, wherein M=8 and N=6.

10. A mobile station as in claim 7, wherein the first N/2 of the time slots are transmitted to have a same sequence of N/2 synchronization words whether the channel is a half-rate channel or a full-rate channel, and wherein the second N/2 of the time slots are transmitted to have a variable sequence of synchronization words depending on whether half data rate or full data rate mobile stations are assigned to the frame.

11. A mobile station as in claim 7, wherein the message is a Digital Traffic Channel Designation message for assigning the mobile station to a digital traffic channel.

12. A mobile station as in claim 7, wherein the message is a Digital Traffic Channel Handoff message for handing off the mobile station from a current digital traffic channel to a different digital traffic channel.

13. A method for operating a mobile station, comprising the steps of:
- storing M time slot synchronization word sequences in a memory of the mobile station;
- receiving a message from of a base station, the message being one of a Digital Traffic Channel Designation message for assigning the mobile station to a digital traffic channel or a Digital Traffic Channel Handoff message for handing off the mobile station from a current digital traffic channel to a different digital traffic channel, the message including a Synchronization Word Structure information element that specifies an order of occurrence of time slot synchronizing word sequences within a frame;
- storing the received Synchronization Word Structure information in the memory of the mobile station;
- receiving a Digital Traffic Channel signal that is transmitted by the base station to contain repeating frames each comprising N time slots, where M>N, individual ones of the time slots including a synchronizing word;
- correlating the received Digital Traffic Channel signal in accordance with the stored time slot synchronization word sequences and the stored Synchronization Word Structure information so as to obtain a plurality of frame synchronization indications within one frame; and
- synchronizing the mobile station to at least one assigned time slot of the Digital Traffic Channel in cooperation with the plurality of frame synchronization indications.

14. A method as in claim 13, wherein M=8 and N=6.

15. A method as in claim 13, wherein the first N/2 of the time slots are transmitted to have a same sequence of N/2 synchronization words whether the channel is a half-rate channel or a full-rate channel, and wherein the second N/2 of the time slots are transmitted to have a variable sequence of synchronization words depending on whether half data rate or full data rate mobile stations are assigned to the frame.

* * * * *

UNITED STATES PATENT AND TRADEMARK OFFICE
CERTIFICATE OF CORRECTION

PATENT NO.    : 6,256,304 B1
DATED         : July 3, 2001
INVENTOR(S)   : Mika Vayrynen It is certified that error appears in the above-identified patent and that said Letters Patent is hereby corrected as shown below:

Column 9,
Line 9, "receiving a message from of a base station, the message" should read
-- receiving a message from one of an analog control channel or a digital control channel of a base station, the message --

Signed and Sealed this

Twenty-third Day of April, 2002

Attest:

Attesting Officer

JAMES E. ROGAN
*Director of the United States Patent and Trademark Office*